(12) United States Patent
Agerstam et al.

(10) Patent No.: US 10,574,445 B2
(45) Date of Patent: Feb. 25, 2020

(54) RANGE CONSTRAINED DEVICE CONFIGURATION

(71) Applicant: Intel IP Corporation, Santa Clara, CA (US)

(72) Inventors: Mats Gustav Agerstam, Portland, OR (US); Venkata R. Vallabhu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 139 days.

(21) Appl. No.: 15/386,485

(22) Filed: Dec. 21, 2016

(65) Prior Publication Data

US 2018/0176009 A1 Jun. 21, 2018

(51) Int. Cl.
*H04L 9/08* (2006.01)
*H04L 29/08* (2006.01)
(Continued)

(52) U.S. Cl.
CPC ........ *H04L 9/0841* (2013.01); *H04L 41/0803* (2013.01); *H04L 41/28* (2013.01);
(Continued)

(58) Field of Classification Search
CPC ....... H04L 9/0841; H04L 9/14; H04L 9/3013; H04W 4/80; H04W 12/04; H04W 12/06; H04W 12/08; H04W 52/38; H04W 76/11
See application file for complete search history.

(56) References Cited

U.S. PATENT DOCUMENTS

| 8,331,544 B2 | 12/2012 | Kraus et al. |
| 9,054,961 B1 | 6/2015 | Kim et al. |

(Continued)

FOREIGN PATENT DOCUMENTS

| KR | 1020140085504 | 7/2014 |
| WO | WO-2016003311 A1 | 1/2016 |
| WO | WO-2018118320 A1 | 6/2018 |

OTHER PUBLICATIONS

"International Application Serial No. PCT US2017 062752, Written Opinion dated Mar. 19, 2018", 8 pgs.

(Continued)

*Primary Examiner* — Mohammed Waliullah
(74) *Attorney, Agent, or Firm* — Schwegman Lundberg & Woessner, P.A.

(57) ABSTRACT

Disclosed in some examples are methods, systems, and machine readable mediums for secure, low end-user effort computing device configuration. In some examples the IoT device is configured via a user's computing device over a short range wireless link of a first type. This short range wireless communication may use a connection establishment that does not require end-user input. For example, the end user will not have to enter, or confirm a PIN number or other authentication information such as usernames and/or passwords. This allows configuration to involve less user input. In some examples, to prevent man-in-the-middle attacks, the power of a transmitter in the IoT device that transmits the short range wireless link is reduced during a configuration procedure so that the range of the transmissions to and from the user's computing device are reduced to a short distance.

24 Claims, 6 Drawing Sheets

(51) Int. Cl.

| | | |
|---|---|---|
| *H04L 12/24* | (2006.01) | |
| *H04L 29/06* | (2006.01) | |
| *H04W 52/38* | (2009.01) | |
| *H04W 12/04* | (2009.01) | |
| *H04W 76/11* | (2018.01) | |
| *H04W 12/02* | (2009.01) | |
| *H04W 8/00* | (2009.01) | |
| *H04W 76/14* | (2018.01) | |
| *H04W 88/12* | (2009.01) | |
| *H04W 4/80* | (2018.01) | |
| *H04W 4/70* | (2018.01) | |
| *H04W 88/06* | (2009.01) | |

(52) U.S. Cl.
CPC ............ *H04L 63/061* (2013.01); *H04L 63/18* (2013.01); *H04L 63/20* (2013.01); *H04L 67/141* (2013.01); *H04L 67/16* (2013.01); *H04L 67/34* (2013.01); *H04L 69/14* (2013.01); *H04W 8/005* (2013.01); *H04W 12/02* (2013.01); *H04W 12/04* (2013.01); *H04W 52/38* (2013.01); *H04W 76/11* (2018.02); *H04W 76/14* (2018.02); *H04L 67/12* (2013.01); *H04W 4/70* (2018.02); *H04W 4/80* (2018.02); *H04W 88/06* (2013.01); *H04W 88/12* (2013.01)

(56) References Cited

U.S. PATENT DOCUMENTS

| | | |
|---|---|---|
| 2010/0317289 A1 | 12/2010 | Desai et al. |
| 2013/0036231 A1 | 2/2013 | Suumaki |
| 2013/0094491 A1 | 4/2013 | Sun et al. |
| 2014/0302783 A1* | 10/2014 | Aiuto .................... H04W 52/16 455/41.2 |
| 2016/0037436 A1 | 2/2016 | Spencer et al. |
| 2016/0127996 A1 | 5/2016 | Patil et al. |

OTHER PUBLICATIONS

"International Application Serial No. PCT US2017 062752, International Search Report dated Mar. 19, 2018", 3 pgs.

"Simplifying IoT: Connecting, Commissioning, and Controlling with Near Field Communication (NFC)—NFC Makes the Smart Home a Reality", NFC Forum, (Jun. 2016), 1-11.

* cited by examiner

RANGE CONSTRAINED DEVICE CONFIGURATION

TECHNICAL FIELD

Embodiments pertain to configuration of devices. Some embodiments relate to configuration of computing devices such as Internet of Things (IoT) devices.

BACKGROUND

The IoT is a network of devices or "things" embedded with electronics, software, and sensors which enables these objects to collect and exchange data between themselves and between other computing devices. Example "things" include connected home appliances, sensors in automobiles, biochips, and the like. These devices communicate with other devices, servers, and computers across one or more networks and may even form and participate in mesh networks. In some examples, IoT devices may be computing devices such as Wireless Local Area Network (WLAN) routers, range extenders, or the like.

An IoT device may be defined as a computing device with network connectivity and one or more network-accessible functions. These functions include reading sensor values, performing actions (such as actuation of a motor), providing status, and the like. Example IoT devices include connected thermostats, appliances, vehicles, and the like.

Many IoT devices also allow configuration remotely over a network. In order to connect to a network, the IoT device must be initially configured with network parameters of the end user's network. For example, the devices may need a Service Set Identifier (SSID), security information (e.g., security type such as Wi-Fi Protected Access 2 (WPA-2)), password, X. 509 certificates, and other credentials to connect to a Wireless Local Area Network (WLAN). Because the IoT device needs to at least be initially configured with these network parameters, many IoT devices include a user interface, such as a display and an input mechanism to enable such configuration. The additional hardware and software to implement a display and input mechanism increases the cost of these IoT devices. Furthermore, any configuration needs to be secured against unauthorized individuals. Some device manufacturers have responded with limited input capabilities and displays. For example, on-screen keyboards which require the user to hunt and click or press using a mouse or finger. These solutions are a hassle for users as they are slow and difficult to use.

Further, while so-called "headless" IoT devices that feature limited or no direct user input and output mechanisms (except a network connection) are desirable due to their low cost, these devices have a chicken and egg problem—without a user interface and with only a network configuration it is difficult to configure the device to operate on the network and thus be configured via the network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Existing solutions to onboard these IoT devices consist of a smartphone hosting a known access point that the AP is hardwired to connect to when it is in the un-configured state. Configuration data can be sent from the smart phone and sent to the IoT device which then reboots and joins the configured network. Another existing solution is to have the IoT device host a soft access point which is found from the smartphone configuration application. The user is either prompted to connect to the network from the settings screen (when programmatic access to WiFi management APIs are not available in the mobile OS) or the application connects automatically. The soft AP may have security enabled which requires a password that the user must enter (the password may be printed on the device or in the box). In yet another existing solution the smart phone uses Bluetooth to push WIFI credentials to the IoT device. If a bonded connection is required, the user is first required to go through the pairing process in the native OS user interface. Otherwise the WiFi credentials are sent across an insecure GATT or RFCOMM connection.

Disclosed in some examples are methods, systems, and machine readable mediums for secure, low end-user effort computing device (e.g., IoT device) configuration. In some examples the IoT device is configured via a user's computing device (e.g., a smartphone or other mobile device) over a short range wireless link of a first type (e.g., BLUETOOTH® Low Energy (BLE)). This short range wireless communication may use a connection establishment that does not require end-user input. For example, the end user will not have to enter, or confirm a PIN number or other authentication information such as usernames and/or passwords. This allows configuration to involve less user input.

In some examples, to prevent man-in-the-middle (MITM) attacks, the power of a transmitter in the IoT device that transmits the short range wireless link is reduced during a configuration procedure so that the range of the transmissions to and from the user's computing device are reduced to a short distance. Thus, in order to configure the device, the user's computing device must be physically close to the IoT device. The short distance may be short enough to make MITM attacks practically impossible as any attempt would be detectable by the end user as the user would be able to observe a third party in the physical vicinity of the IoT device. The device may then be configured over this wireless link (which may be secured during initial establishment—e.g., by a key exchange protocol such as Diffie Hellman key, for example). In some examples, the configuration may include configuration parameters for a second wireless link of a second type (e.g., WIFI).

Short range wireless links (connections) as used herein are wireless communications established according to BLUETOOTH, BLUETOOTH Low Energy (BLE), WIFI, and other wireless technologies. This is in contrast to long range wireless communications using cellular wireless technologies (e.g., Long Term Evolution (LTE)).

In some examples, as noted, the transmit power of the transceiver for the short range wireless link of the first type may be attenuated or reduced such that the power level is below a predetermined threshold. The predetermined threshold may be adjusted or set (e.g., by the manufacturer of the IoT device, or by a user) so as to produce an approximate desired range for configuration (e.g., 15 feet, 10 feet, 3 feet, and the like). The transmit power may be reduced by injecting power control commands into the transmitter, for example, a BLUETOOTH transmit power control command may be utilized to reduce the power to 1 milliwatt, which produces a transmit range of about 1 meter (3 feet). In other examples, a software controlled attenuator may be included between the transceiver output and the antenna which may be configurable and may allow the transmitter to be attenuated regardless of the wireless protocol. In general the transmit power may be reduced from a power that would normally be transmitted in the absence of the reduction to a power level that is chosen so as to require a close (e.g., within a predetermined distance, e.g., 10 feet) physical proximity to configure the device.

Figure 1:
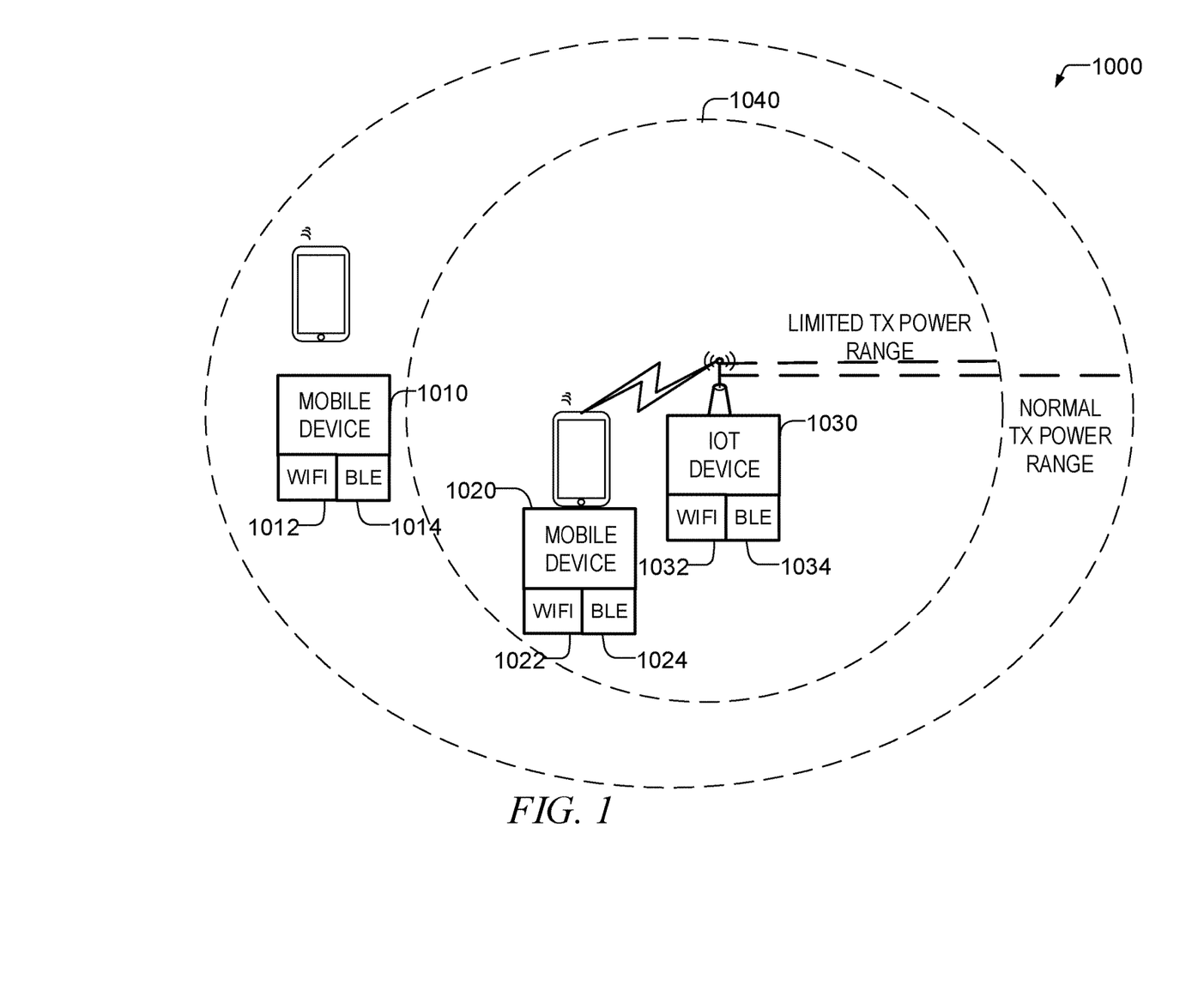
FIG. 1 shows a diagram of an IoT device setup environment according to some examples of the present disclosure.

Turning now to FIG. 1, a diagram of an IoT device setup environment 1000 is shown according to some examples of the present disclosure. In the example of FIG. 1, the IoT device 1030 is a WLAN router, but in other examples IoT device 1030 may be a range extender, or other IoT device. IoT device 1030 has WIFI transmitter 1032 and BLE transmitter 1034. IoT device 1030 sends connectable advertisements to join a BLE piconet (e.g., wireless network 1040). These advertisements, and the subsequent piconet formed are limited in wireless range so as to require configuring computing devices to be in close physical proximity to the IoT device 1030 in order to configure it. Computing device 1010, with WIFI transmitter 1012 and BLE transmitter 1014 is out of range of the wireless network 1040 and thus does not hear the advertisements and other piconet communications from IoT device 1030. In contrast, computing device 1020, with WIFI transmitter 1022 and BLE transmitter 1024 is in range of the wireless network 1040 and may connect to and configure the IoT device 1030. As noted in the diagram, the transmission range is limited to the innermost circle as a result of the deliberate reduction of transmission power. The outermost circle represents that normal transmission range resulting from a normal transmission power and includes computing device 1010. The lowering of the transmission power has lowered the effective range of the communications of the IoT device 1030.

Figure 2:
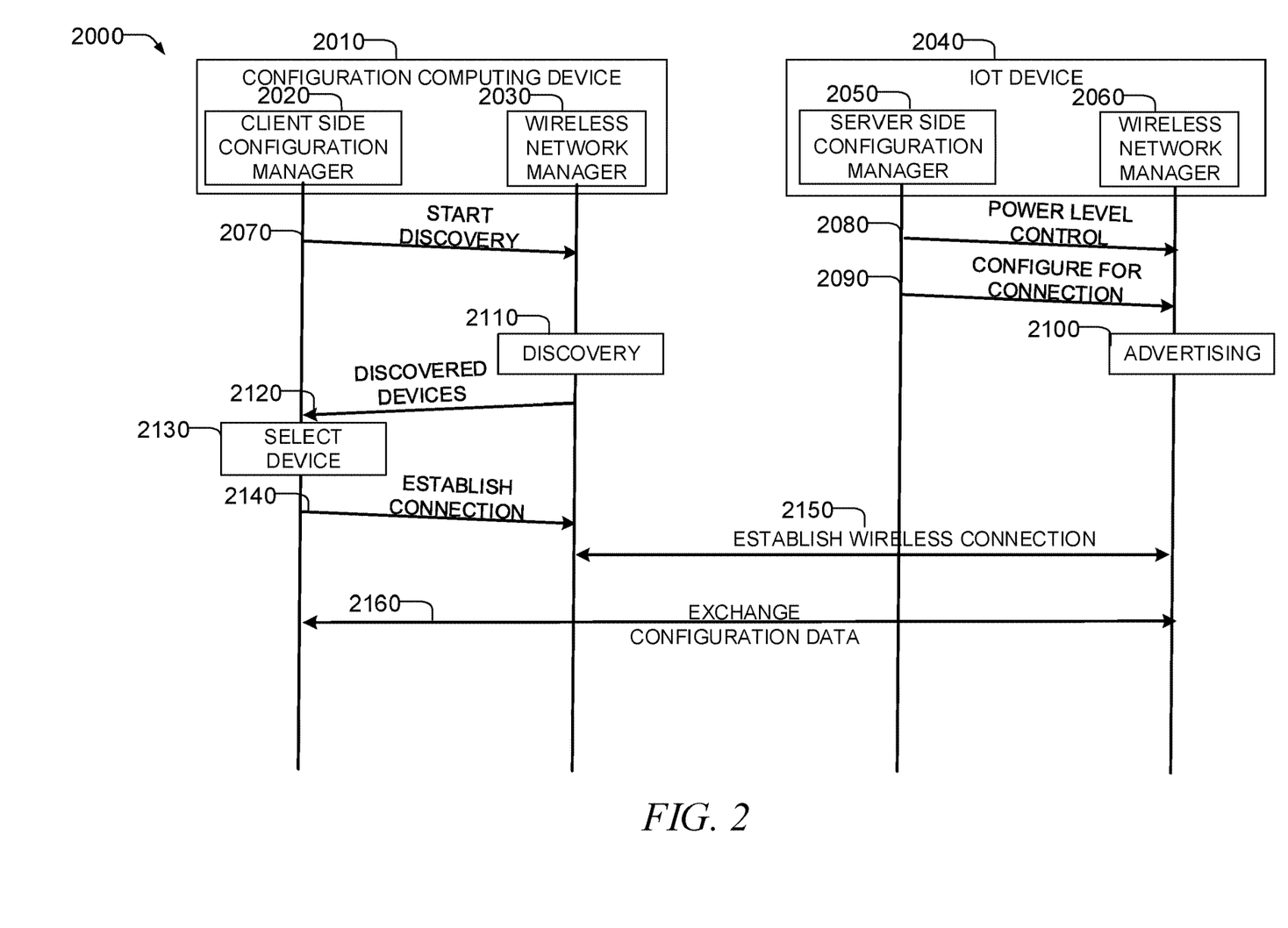
FIG. 2 shows a message sequence chart of an IoT device setup according to some examples of the present disclosure.

Turning now to FIG. 2, a message sequence chart 2000 is shown of an IoT device setup according to some examples of the present disclosure. The configuration computing device (e.g., the mobile device of the user) 2010 executes a client side configuration manager 2020. The client side configuration manager 2020 may be part of an application used to configure, control, and otherwise communicate with the IoT device 2040. Client side configuration manager 2020 may communicate with server side configuration manager 2050 executing on the IoT device 2040 over a wireless network provided by wireless network manager 2030. Client side configuration manager 2020 may communicate with server side configuration manager 2050 on the IoT device 2040 to configure one or more parameters of IoT device 2040, such as a second wireless network. Wireless network manager 2030 may implement one or more layers of one or more network protocols (e.g., wireless network manager 3085 of FIG. 3). For example, Physical, Data Link, Network, Transport, Session, Presentation, and Application layers, base band, link manager protocol (LMP), Logical Link Control Adaption Protocol (L2CAP), RFCOMM, Service Discovery Protocol, Modem Protocols, Internet Protocols, and the like. Wireless network manager 2030 may also implement one or more profiles, such as attribute protocol (ATT), generic attribute profile (GATT) and other profiles. Wireless network manager 2030 may include transceivers or other hardware necessary to wirelessly transmit and receive data.

As part of a user input or other trigger that notifies client side configuration manager 2020 that a new device needs to be configured, the client side configuration manager 2020 instructs the wireless network manager 2030 at 2070 to begin discovering for IoT devices. Upon powering up, the server side configuration manager 2050 of IoT device 2040 may determine whether the device is in a configured or unconfigured state. If it is in an unconfigured state, the server side configuration manager 2050 may instruct the wireless network manager 2060 to reduce transmit power at 2080. At 2090 the server side configuration manager 2050 may instruct the wireless network manager 2060 to begin advertising its availability for a wireless network connection and configuration. For example, it may advertise a configuration service. Included in this process may be advertising one or more services with particular Universal Unique Identifiers (UUID) that describe the device and indicate that it is available for configuration. Also advertised is a device name, and other information. At 2100 advertising the service begins. At 2110 wireless network manager 2030 scans one or more wireless frequencies (e.g., public advertisement channels) seeking devices broadcasting the particular UUIDs indicating supported devices that are ready for configuration.

Discovery 2110 may proceed for a predetermined period of time. At 2120, once the predetermined period of time is elapsed (or as the networks are discovered), the list of discovered devices is passed back to the client side configuration manager 2020. The client side configuration manager 2020 may present the list of discovered devices to a user (e.g., in a GUI). The user may then select one of the discovered unconfigured devices to configure at 2130. In some examples, if no devices were discovered, the user may be instructed to move physically closer to the device they wish to configure.

Once a device is selected, the client side configuration manager 2020 instructs the wireless network manager 2030 to establish a connection at 2140 with the selected device. At 2150 one or more messages are exchanged between wireless network manager 2030 of configuration computing device 2010 and wireless network manager 2060 of IoT device 2040 to establish the wireless connection. Once the connection is established, the client side configuration manager 2020 communicates with server side configuration manager 2050 to configure the device 2160 via the wireless network manager 2030 and the wireless network manager 2060.

Figure 3:
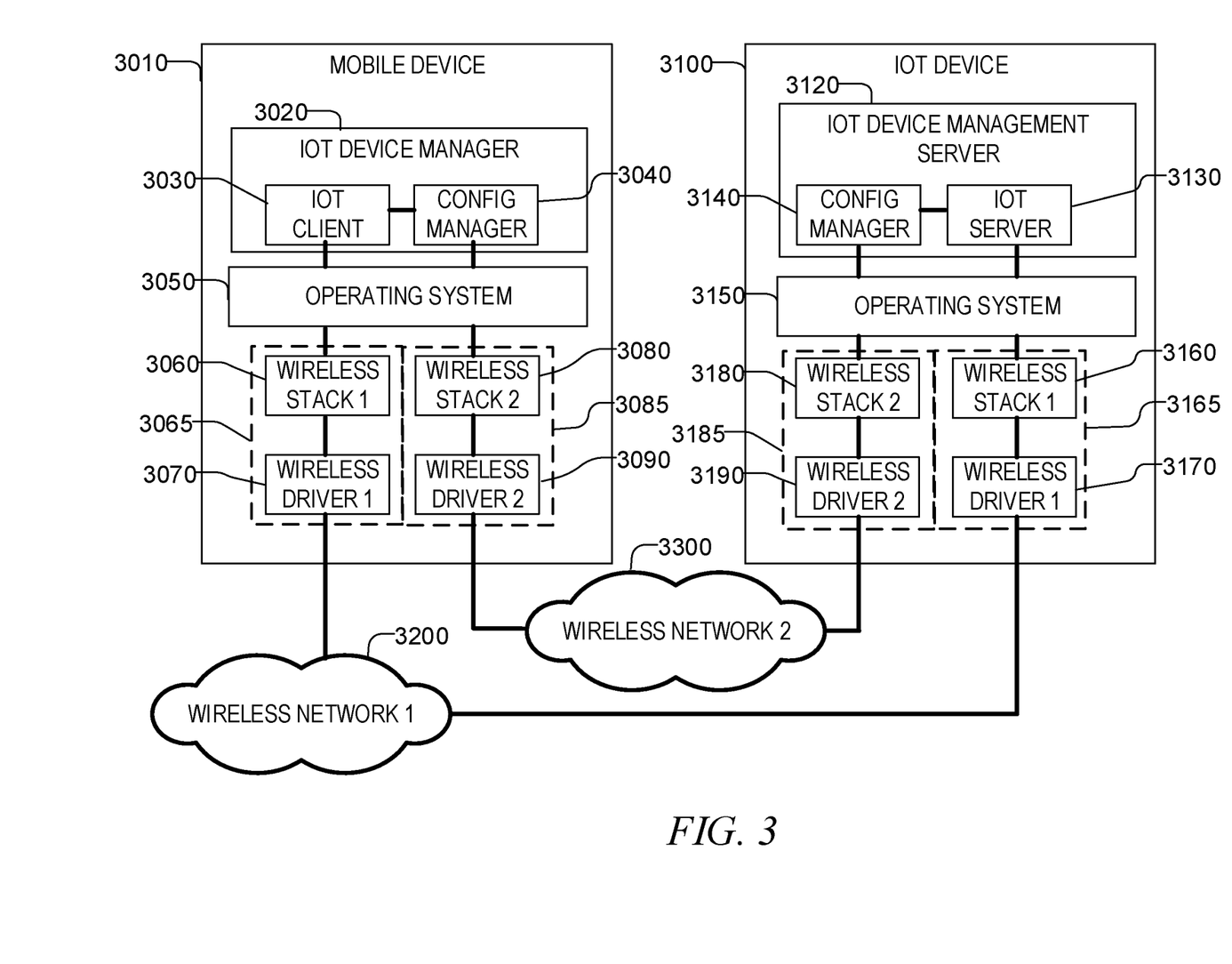
FIG. 3 shows a schematic diagram of a mobile device and an IoT device according to some examples of the present disclosure.

Turning now to FIG. 3, a schematic diagram of a mobile device 3010 and an IoT device 3100 is shown according to some examples of the present disclosure. Mobile device 3010 may include an IoT device manager 3020 (e.g., a device management application) which may include an IoT client 3030 and a client side configuration manager 3040 (which in some examples is an embodiment of client side configuration manager 2020 of FIG. 2). The IoT client 3030 interacts with IoT server 3130 of IoT device management server 3120 of IoT device 3100 to provide IoT functionality. For example, if the IoT device 3100 was a connected thermostat, the IoT client 3030 and IoT server 3130 would provide for the ability to see the current temperature, modify the thermostat set points (e.g., when the heat or A/C kicks on) and other settings.

Client side configuration manager 3040 of the mobile device 3010 interacts with the server side configuration manager 3140 (which in some examples is an embodiment of server side configuration manager 2050 of FIG. 2) of the IoT device 3100 to set the configuration, including the configuration of the wireless network 1 3200. This is done over wireless network 2 3300. In some examples, wireless network 2 3300 is a BLE piconet (e.g., according to a BLUETOOTH LOW ENERGY standard as promulgated by the BLUETOOTH® Special Interest Group) and wireless network 1 3200 is a Wireless Local Area Network (WLAN) (e.g., according to an Institute of Electrical and Electronics Engineers (IEEE) 802.11 family of standards). For example, the Service Set Identifier, security settings, and passwords to access the wireless network 1 3200 may be configured across wireless network 2 3300. Wireless network 1 3200 may be provided by another computing device (e.g., a wireless access point).

Client side configuration manager 3040 and IoT client 3030 make use of service provided by operating system 3050 to establish and communicate over wireless network 2 3300 and wireless network 1 3200. For example, the operating system 3050 may provide or interface with one or more wireless network managers 3065, 3085 (wireless network manager 3085 may be an embodiment of wireless network manager 2030 of FIG. 2). Wireless network managers include one or more wireless stacks and wireless drivers, such as wireless stack 1 3060 for wireless network 1 3200 and wireless stack 2 3080 for wireless network 2 3300. Wireless stacks may provide one or more protocol stacks for wireless networks. Example protocols include Physical Layer protocols, Data link layer protocols, Medium Access Control (MAC) protocols, Transmission Control Protocol (TCP), application layer protocols, baseband protocols, link management protocols (LMP), logical link control adaption protocol (L2CAP), service discovery protocols (SDP), application protocols, GATT, AT, and other profiles, and the like.

Wireless driver 1 3070 and wireless driver 2 3090 may include the physical hardware necessary to modulate the data from the wireless stacks and transmit it across the wireless channel to the IoT device 3100. For example, wireless driver 2 3090 may employ a frequency hopping spread spectrum with Gaussian Frequency Shift Keying (GFSK), 4 Differential Quadrature Phase Shift Keying (DQPSK), or 8 DQPSK modulation. In another example, wireless driver 1 3070 may employ Orthogonal Frequency Division Multiplexing with Binary Phase Shift Keying (BPSK), Quadrature Phase Shift Keying (QPSK) or Quadrature Amplitude Modulation (16, or 64 QAM).

Similarly, wireless network managers 3185 and 3165 (wireless network manager 3185 may be an embodiment of wireless network manager 2060 of FIG. 2) may include wireless drivers and wireless stacks. Wireless driver 1 3170 and wireless driver 2 3190 may include the physical hardware necessary to modulate the data from the wireless stacks and transmit it across the wireless channel to the mobile device 3010. For example, wireless driver 2 3190 may employ a frequency hopping spread spectrum with Gaussian Frequency Shift Keying (GFSK), 4 Differential Quadrature Phase Shift Keying (DQPSK), or 8 DQPSK modulation. In another example, wireless driver 1 3170 may employ Orthogonal Frequency Division Multiplexing with Binary Phase Shift Keying (BPSK), Quadrature Phase Shift Keying (QPSK) or Quadrature Amplitude Modulation (16, or 64 QAM).

Server side configuration manager 3140 and IoT server 3130 make use of services provided by operating system 3150 to establish and communicate over wireless network 2 3300 and wireless network 1 3200. For example, the operating system 3150 may provide or interface with one or more wireless managers (e.g., wireless manager 3185 and 3165) including wireless stacks, such as wireless stack 1 3160 for wireless network 1 3200 and wireless stack 2 3180 for wireless network 2 3300. Wireless stacks may provide one or more protocol stacks for wireless networks. Example protocols include Physical Layer protocols, Data link layer protocols, Medium Access Control (MAC) protocols, Transmission Control Protocol (TCP), application layer protocols, baseband protocols, link management protocols (LMP), logical link control adaption protocol (L2CAP), service discovery protocols (SDP), application protocols, and the like. As noted previously, server side configuration manager 3140 may interact with client side configuration manager 3040 to configure the IoT device 3100. Additionally, the IoT server 3130 may provide IoT functionality.

Figure 4:
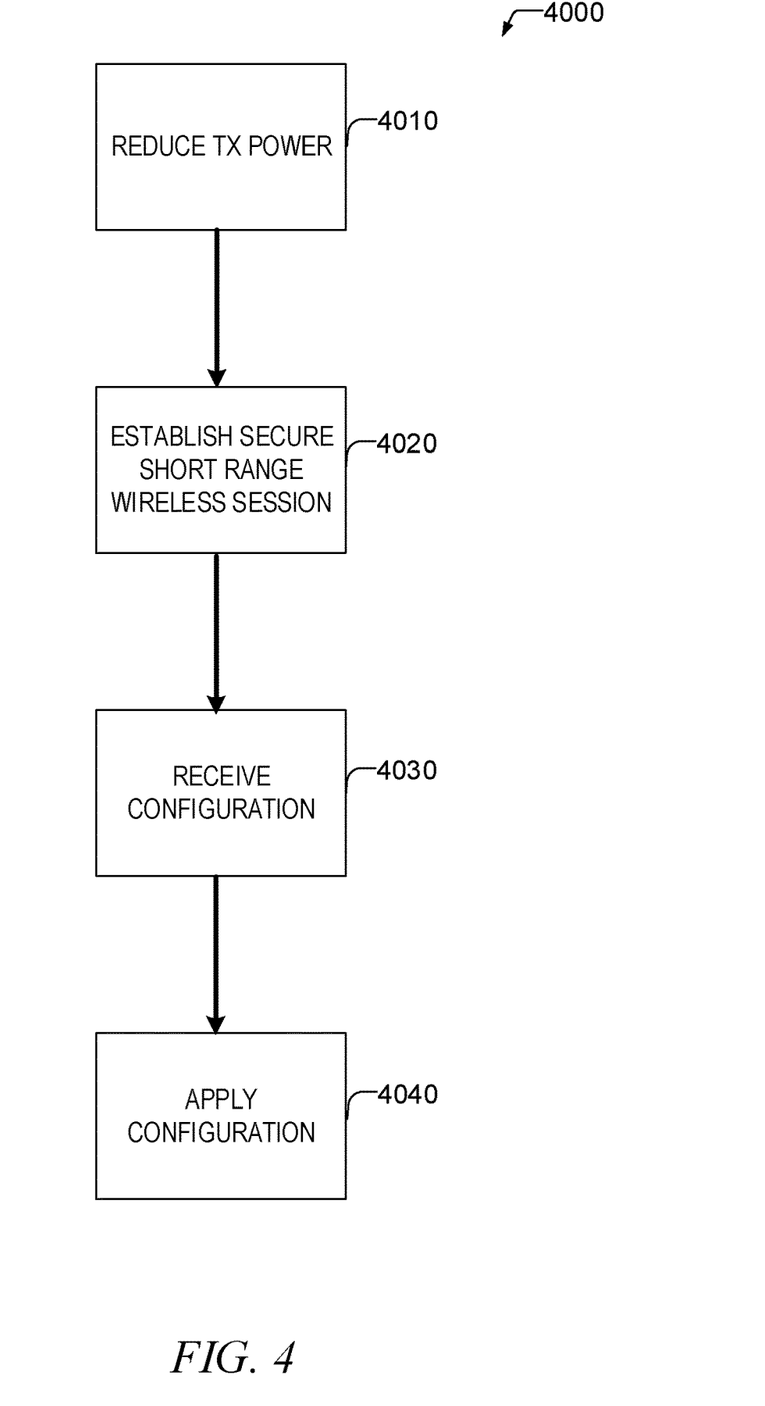
FIG. 4 shows a flowchart of a method of configuring an IoT device according to some examples of the present disclosure.

Turning now to FIG. 4 a flowchart of a method 4000 of configuring an IoT device is shown according to some examples of the present disclosure. At operation 4010 the transmit power of at least one transmission of the IoT device is lowered. This may be accomplished by instructing the transmitter to transmit at a power less than a normal power level that would be transmitted absent the lowering command. The transmit power may be lowered a particular threshold amount. In other examples, the transmit power may be specified as a maximum transmission power based upon an expected desired transmission range. At operation 4020 the IoT device may establish a secure short range wireless session. In some examples, the short range wireless session is established using the lowered transmission power. For example, if the wireless connection is a Bluetooth Low Energy connection, the IoT device may broadcast an advertisement (at a reduced power). The mobile device may receive this advertisement and respond with a connection request. Once connected, the devices may establish a secure connection, for example, by exchanging or agreeing on cryptographic keys, such as by using a Diffie Hellman key exchange. Part of the connection process may include a pairing process. In some example pairing methods, the devices may utilize a "Just Works" pairing method that does not require entering anything into either device. In other examples, other pairing methods may be utilized such as passkey entry, numeric comparison, and out of band (e.g., the configuration application and the IoT device are preconfigured with the necessary pairing information and security keys).

At operation 4030 the IoT device may receive configuration information. For example, the IoT device may receive information about connecting to a second wireless network (e.g., a second wireless connection type). For example, where the secure short range wireless session created at operation 4020 was of a BLE type, the second type may be a WLAN type. In other examples, the secure short range wireless session created at operation 4020 may be a WLAN type and the second type may be a BLE type. In other examples, other combinations of network type may be utilized. At operation 4040 the IoT device may apply the configuration settings. In some examples, this may include closing the wireless connection and establishing a second wireless connection over the second wireless network using the configuration information.

Figure 5:
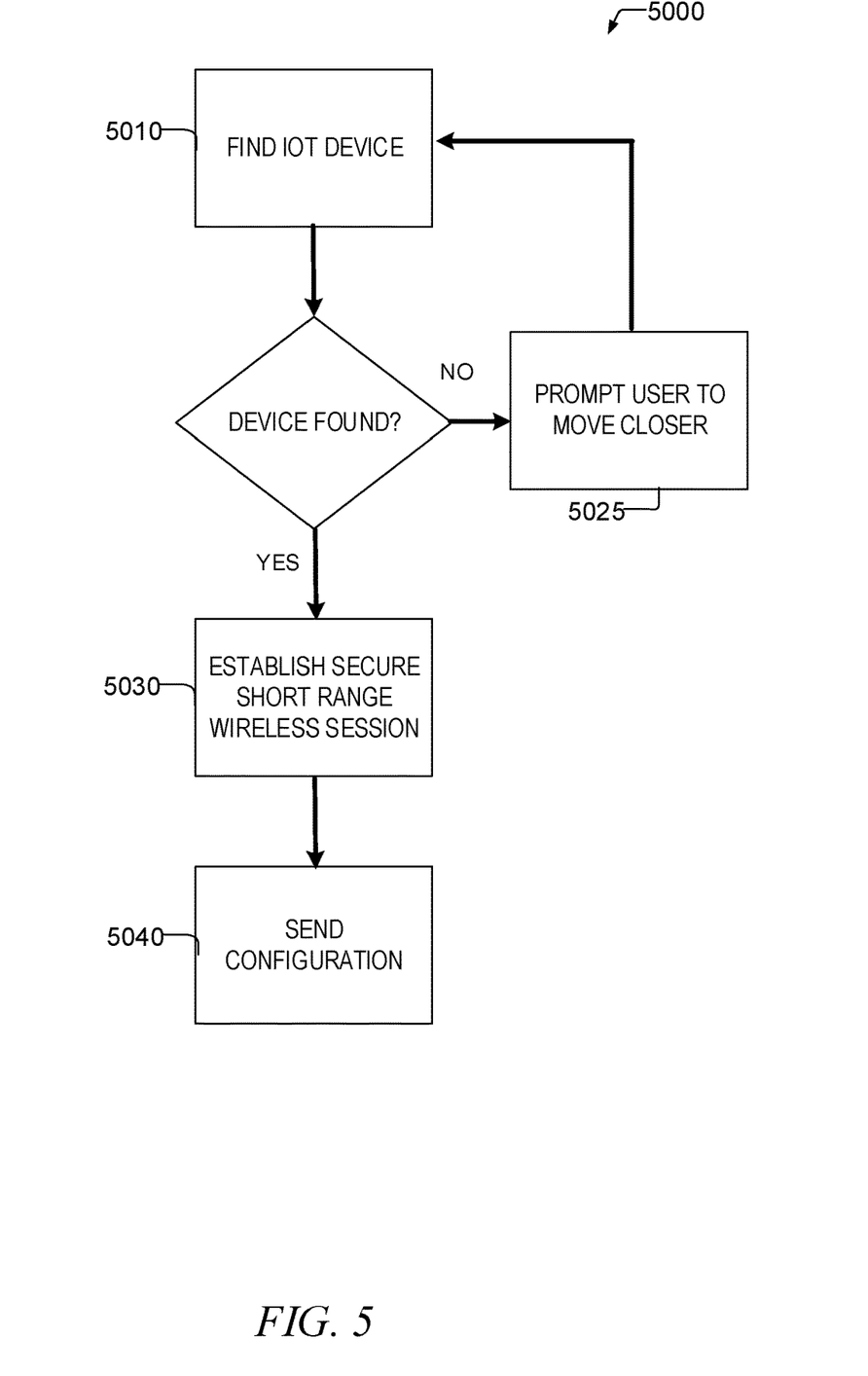
FIG. 5 shows a flowchart of a method for configuring an IoT device according to some examples of the present disclosure.

Turning now to FIG. 5 a flowchart of a method 5000 for configuring an IoT device is shown according to some examples of the present disclosure. At operation 5010 the mobile device may find the IoT device. For example, the mobile device may search for BLE advertisements sent by IoT devices. If no devices are found, the mobile device may prompt the user to move closer to the device they desire to configure at operation 5025. In some examples, if multiple devices are found, the mobile device may provide a graphical user interface (GUI) to allow the user to select a device they wish to configure. At operation 5030 the mobile device may establish a secure short range wireless session. For example, if the wireless connection is a Bluetooth Low Energy connection, the IoT device may broadcast an advertisement. The mobile device may receive this advertisement and respond with a connection request. Once connected, the devices may establish a secure connection, for example, by exchanging cryptographic keys, such as by using a Diffie Hellman key exchange. At operation 5040 the mobile device may send the configuration to the IoT device. For example, the configuration may be exchanged using the Generic Attribute Profile (GATT).

While configuring IoT devices was described herein, one of ordinary skill in the art will appreciate that the disclosed configuration techniques are applicable to configuring computing devices generally where the devices are wirelessly configurable by another computing device. Indeed, the environment of FIG. 1, the messaging of FIG. 2, block diagram of FIG. 3, and methods of FIGS. 4 and 5 are equally applicable to other computing devices.

Figure 6:
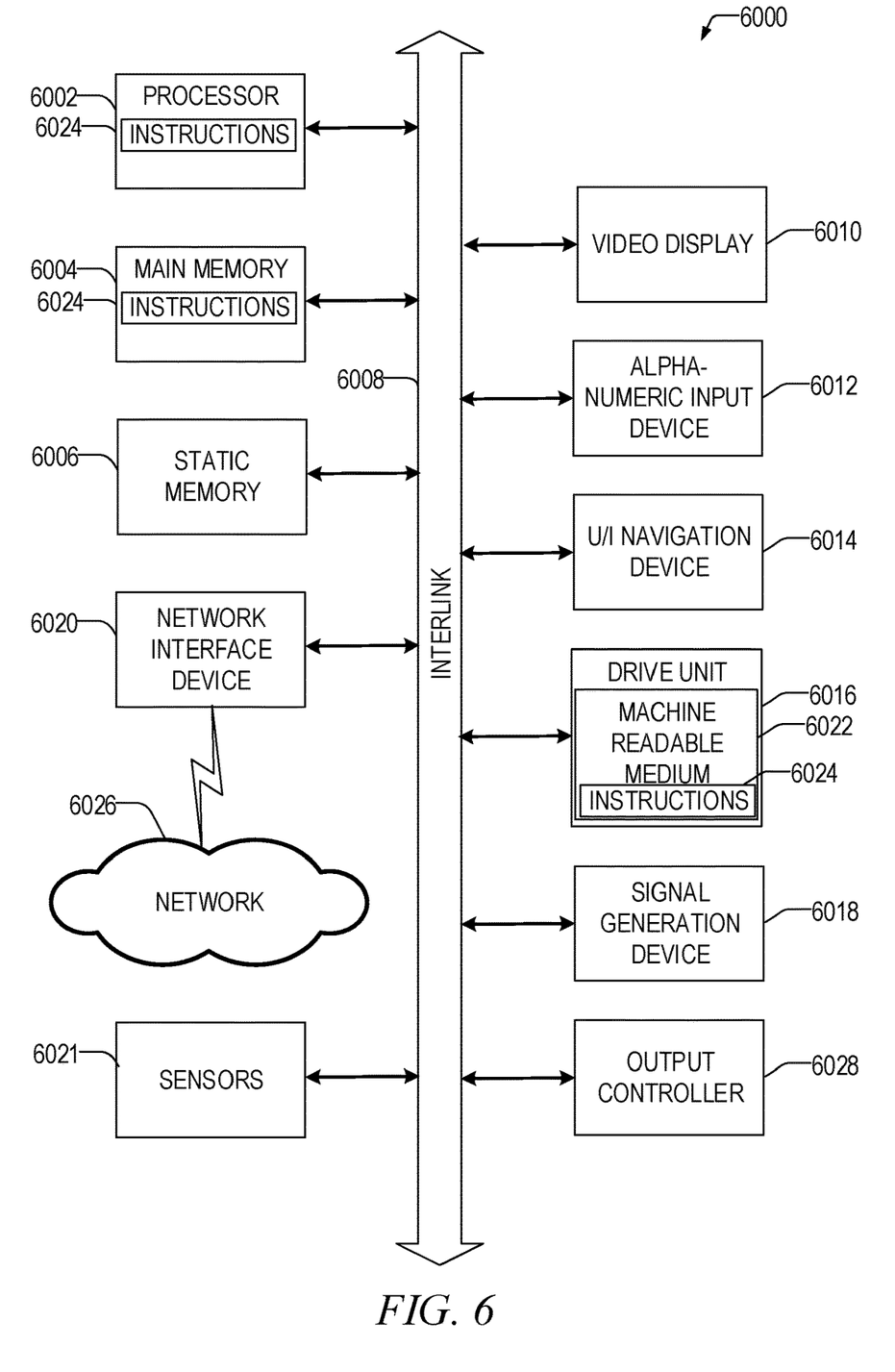
FIG. 6 is a block diagram illustrating an example of a machine upon which one or more embodiments may be implemented according to some examples of the present disclosure.

FIG. 6 illustrates a block diagram of an example machine 6000 upon which any one or more of the techniques (e.g., methodologies) discussed herein may perform. In alternative embodiments, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may implement or additionally include the components of FIG. 3, perform the methods of FIGS. 4 and 5, send the messages of FIG. 2, and take the role of any device of FIG. 1. The machine 6000 may be a IoT device, a computing device for configuring the IoT device, a wireless router, a range extender, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The Machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

Other Notes and Examples

Example 1 is a network connected computing device comprising: a processor; a memory communicatively coupled to the processor, the memory comprising instructions, the instructions, when performed by the processor cause the network connected computing device to perform operations to: reduce an output transmission power of the network connected computing device of a first wireless connection of a first wireless connection type; advertise a configuration service; establish a secure short range wireless session with a configuring computing device, the secure session established without a user input specifying security parameters of the secure short range wireless session; receive configuration information of the network connected computing device; apply the configuration information to the network connected computing device, the configuration specifying one or more parameters of a second wireless connection type; and establish a second wireless connection of the second wireless connection type according to the one or more parameters.

In Example 2, the subject matter of Example 1 optionally includes wherein the operations to establish the secure short range wireless session comprises operations to: establish an insecure short range wireless session; utilize a key exchange protocol to exchange a cryptographic key; and utilize the cryptographic key to engage in encrypted communications with the configuring computing device.

In Example 3, the subject matter of Example 2 optionally includes wherein the operations to establish an insecure short range wireless session comprises pairing using a pairing process not requiring user input.

In Example 4, the subject matter of Example 3 optionally includes wherein the pairing process is a JUST WORKS BLUETOOTH LOW ENERGY pairing process.

In Example 5, the subject matter of any one or more of Examples 2-4 optionally include wherein the key exchange protocol is a Diffie Hellman key exchange protocol.

In Example 6, the subject matter of any one or more of Examples 1-5 optionally include wherein the first wireless connection type is a BLUETOOTH LOW ENERGY wireless connection type.

In Example 7, the subject matter of Example 6 optionally includes wherein the second wireless connection type is a Wireless Local Area Network (WLAN) according to an Institute for Electrical and Electronics Engineers (IEEE) 802.11 family of standards.

In Example 8, the subject matter of any one or more of Examples 1-7 optionally include wherein the operations to reduce an output transmission power of the network connected computing device of a first wireless connection of a first wireless connection type comprises operations to: send a power control command to a transmitter.

Example 9 is at least one machine readable medium, comprising instructions, which when executed by a machine, causes the machine to perform operations for configuration of a network connected computing device, the operations comprising: reducing an output transmission power of the network connected computing device of a first wireless connection of a first wireless connection type; advertising a configuration service; establishing a secure short range wireless session with a configuring computing device, the secure session established without a user input specifying security parameters of the secure short range wireless session; receiving configuration information of the network connected computing device; applying the configuration information to the network connected computing device, the configuration specifying one or more parameters of a second wireless connection type; and establishing a second wireless connection of the second wireless connection type according to the one or more parameters.

In Example 10, the subject matter of Example 9 optionally includes wherein establishing the secure short range wireless session comprises: establishing an insecure short range wireless session; utilizing a key exchange protocol to exchange a cryptographic key; and utilizing the cryptographic key to engage in encrypted communications with the configuring computing device.

In Example 11, the subject matter of Example 10 optionally includes wherein the operations of establishing an insecure short range wireless session comprises pairing using a pairing process not requiring user input.

In Example 12, the subject matter of Example 11 optionally includes wherein the pairing process is a JUST WORKS BLUETOOTH LOW ENERGY pairing process.

In Example 13, the subject matter of any one or more of Examples 10-12 optionally include wherein the key exchange protocol is a Diffie Hellman key exchange protocol.

In Example 14, the subject matter of any one or more of Examples 9-13 optionally include wherein the first wireless connection type is a BLUETOOTH LOW ENERGY wireless connection type.

In Example 15, the subject matter of Example 14 optionally includes wherein the second wireless connection type is a Wireless Local Area Network (WLAN) according to an Institute for Electrical and Electronics Engineers (IEEE) 802.11 family of standards.

In Example 16, the subject matter of any one or more of Examples 9-15 optionally include wherein the operations of reducing an output transmission power of the network connected computing device of a first wireless connection of a first wireless connection type comprises: sending a power control command to a transmitter.

Example 17 is a network connected computing device comprising: means for reducing an output transmission power of the network connected computing device of a first wireless connection of a first wireless connection type; means for advertising a configuration service; means for establishing a secure short range wireless session with a configuring computing device, the secure session established without a user input specifying security parameters of the secure short range wireless session; means for receiving configuration information of the network connected computing device; means for applying the configuration information to the network connected computing device, the configuration specifying one or more parameters of a second wireless connection type; and means for establishing a second wireless connection of the second wireless connection type according to the one or more parameters.

In Example 18, the subject matter of Example 17 optionally includes wherein establishing the secure short range wireless session comprises: means for establishing an insecure short range wireless session; means for utilizing a key exchange protocol to exchange a cryptographic key; and means for utilizing the cryptographic key to engage in encrypted communications with the configuring computing device.

In Example 19, the subject matter of Example 18 optionally includes wherein the means for establishing an insecure short range wireless session comprises means for pairing using a pairing process not requiring user input.

In Example 20, the subject matter of Example 19 optionally includes wherein the pairing process is a JUST WORKS BLUETOOTH LOW ENERGY pairing process.

In Example 21, the subject matter of any one or more of Examples 18-20 optionally include wherein the key exchange protocol is a Diffie Hellman key exchange protocol.

In Example 22, the subject matter of any one or more of Examples 17-21 optionally include wherein the first wireless connection type is a BLUETOOTH LOW ENERGY wireless connection type.

In Example 23, the subject matter of Example 22 optionally includes wherein the second wireless connection type is a Wireless Local Area Network (WLAN) according to an Institute for Electrical and Electronics Engineers (IEEE) 802.11 family of standards.

In Example 24, the subject matter of any one or more of Examples 17-23 optionally include wherein the means for reducing an output transmission power of the network connected computing device of a first wireless connection of a first wireless connection type comprises: means for sending a power control command to a transmitter.

Example 25 is a method for configuration of a network connected computing device, the method comprising: reducing an output transmission power of the network connected computing device of a first wireless connection of a first wireless connection type; advertising a configuration service; establishing a secure short range wireless session with a configuring computing device, the secure session established without a user input specifying security parameters of the secure short range wireless session; receiving configuration information of the network connected computing device; applying the configuration information to the network connected computing device, the configuration specifying one or more parameters of a second wireless connection type; and establishing a second wireless connection of the second wireless connection type according to the one or more parameters.

In Example 26, the subject matter of Example 25 optionally includes wherein establishing the secure short range wireless session comprises: establishing an insecure short range wireless session; utilizing a key exchange protocol to exchange a cryptographic key; and utilizing the cryptographic key to engage in encrypted communications with the configuring computing device.

In Example 27, the subject matter of Example 26 optionally includes wherein establishing an insecure short range wireless session comprises pairing using a pairing process not requiring user input.

In Example 28, the subject matter of Example 27 optionally includes wherein the pairing process is a JUST WORKS BLUETOOTH LOW ENERGY pairing process.

In Example 29, the subject matter of any one or more of Examples 26-28 optionally include wherein the key exchange protocol is a Diffie Hellman key exchange protocol.

In Example 30, the subject matter of any one or more of Examples 25-29 optionally include wherein the first wireless connection type is a BLUETOOTH LOW ENERGY wireless connection type.

In Example 31, the subject matter of Example 30 optionally includes wherein the second wireless connection type is a Wireless Local Area Network (WLAN) according to an Institute for Electrical and Electronics Engineers (IEEE) 802.11 family of standards.

In Example 32, the subject matter of any one or more of Examples 25-31 optionally include wherein reducing an output transmission power of the network connected computing device of a first wireless connection of a first wireless connection type comprises: sending a power control command to a transmitter.

Example 33 is a network connected computing device comprising means for performing the methods and to implement any machine of any one or more of Examples 1-32.

Example 34 is at least one machine readable medium, comprising instructions, which when performed by a machine, cause the machine to perform the methods of or implement devices of any one or more of Examples 1-32

What is claimed is:

1. A network connected computing device comprising:
a processor;
a memory communicatively coupled to the processor, the memory comprising instructions, the instructions, when performed by the processor cause the computing device to perform operations to:
identify, during a determination and setup phase, an unconfigured state of the device, by determining that the network connected computing device requires a set of credentials to securely connect to a network; and
reduce an output transmission power of the network connected computing device of a first wireless connection of a first wireless connection type, responsive to determining that the network connected computing device is in the unconfigured state;
advertise, during a configuration information acquisition phase, a configuration service, the configuration service adapted to receive information from a configuration computing device;
establish, during the configuration information acquisition phase, a secure short range wireless session with the configuring computing device, the secure session established without a user input;
receive, responsive to establishing the secure short range wireless connection with the computing device, configuration information of the network connected computing device via the configuration service;
apply, during a configuration information application phase, the configuration information to the network connected computing device, the configuration specifying one or more parameters of a second wireless connection type; and
establish, responsive to applying the configuration information to the network connected computing device, a second wireless connection of the second wireless connection type according to the one or more parameters.

2. The network connected computing device of claim 1, wherein the operations to establish the secure short range wireless session comprises operations to:
establish an insecure short range wireless session;
utilize a key exchange protocol to exchange a cryptographic key; and
utilize the cryptographic key to engage in encrypted communications with the configuring computing device.

3. The network connected computing device of claim 2, wherein the operations to establish an insecure short range wireless session comprises pairing using a pairing process not requiring user input.

4. The network connected computing device of claim 3, wherein the pairing process is a JUST WORKS BLUETOOTH LOW ENERGY pairing process.

5. The network connected computing device of claim 2, wherein the key exchange protocol is a Diffie Hellman key exchange protocol.

6. The network connected computing device of claim 1, wherein the first wireless connection type is a BLUETOOTH LOW ENERGY wireless connection type.

7. The network connected computing device of claim 6, wherein the second wireless connection type is a Wireless Local Area Network (WLAN) according to an Institute for Electrical and Electronics Engineers (IEEE) 802.11 family of standards.

8. The network connected computing device of claim 1, wherein the operations to reduce an output transmission power of the network connected computing device of a first wireless connection of a first wireless connection type comprises operations to:
send a power control command to a transmitter.

9. At least one non-transitory machine readable medium, comprising instructions, which when executed by a machine, causes the machine to perform operations for configuration of a network connected computing device, the operations comprising:
identifying, during a determination and setup phase, an unconfigured state of the device, by determining that the network connected computing device requires a set of credentials to securely connect to a network;
determining, during the determination and setup phase, that the network connected computing device is in an unconfigured state; and
reducing an output transmission power of the network connected computing device of a first wireless connection of a first wireless connection type, responsive to the determination that the network connected computing device is in the unconfigured state;
advertising, during a configuration information acquisition phase, a configuration service, the configuration service adapted to receive information from a configuration computing device;
establishing, during the configuration information acquisition phase, a secure short range wireless session with the configuring computing device, the secure session established without a user input; and
receiving, responsive to establishing the secure short range wireless connection with the computing device, configuration information of the network connected computing device via the configuration service;
applying, in a configuration information application phase, the configuration information to the network connected computing device, the configuration specifying one or more parameters of a second wireless connection type; and
establishing, responsive to applying the configuration information to the network connected computing device, a second wireless connection of the second wireless connection type according to the one or more parameters.

10. The at least one machine readable medium of claim 9, wherein establishing the secure short range wireless session comprises:
establishing an insecure short range wireless session;
utilizing a key exchange protocol to exchange a cryptographic key; and
utilizing the cryptographic key to engage in encrypted communications with the configuring computing device.

11. The at least one machine readable medium of claim 10, wherein the operations of establishing an insecure short range wireless session comprises pairing using a pairing process not requiring user input.

12. The at least one machine readable medium of claim 11, wherein the pairing process is a JUST WORKS BLUETOOTH LOW ENERGY pairing process.

13. The at least one machine readable medium of claim 10, wherein the key exchange protocol is a Diffie Hellman key exchange protocol.

14. The at least one machine readable medium of claim 9, wherein the first wireless connection type is a BLUETOOTH LOW ENERGY wireless connection type.

15. The at least one machine readable medium of claim 14, wherein the second wireless connection type is a Wireless Local Area Network (WLAN) according to an Institute for Electrical and Electronics Engineers (IEEE) 802.11 family of standards.

16. The at least one machine readable medium of claim 9, wherein the operations of reducing an output transmission power of the network connected computing device of a first wireless connection of a first wireless connection type comprises:
sending a power control command to a transmitter.

17. A method for configuration of a network connected computing device, the method comprising:
identifying, during a determination and setup phase, an unconfigured state of the device, by determining that the network connected computing device requires a set of credentials to securely connect to a network;
determining, during the determination and setup phase, that the network connected computing device is in an unconfigured state; and
reducing an output transmission power of the network connected computing device of a first wireless connection of a first wireless connection type, responsive to determining that the network connected computing device is in the unconfigured state;
advertising, in a configuration information acquisition phase, a configuration service, configuration service adapted to receive information from a configuration computing device;
establishing, during the configuration information acquisition phase, a secure short range wireless session with the configuring computing device, the secure session established without a user input; and
receiving, responsive to establishing the secure short range wireless connection with the computing device during the configuration information acquisition phase, configuration information of the network connected computing device;
applying, during a configuration information application phase, the configuration information to the network connected computing device, the configuration specifying one or more parameters of a second wireless connection type; and
establishing, responsive to applying the configuration information to the network connected computing device during the configuration information phase, a second wireless connection of the second wireless connection type according to the one or more parameters.

18. The method of claim 17, wherein establishing the secure short range wireless session comprises:
establishing an insecure short range wireless session;
utilizing a key exchange protocol to exchange a cryptographic key; and
utilizing the cryptographic key to engage in encrypted communications with the configuring computing device.

19. The method of claim 18, wherein establishing an insecure short range wireless session comprises pairing using a pairing process not requiring user input.

20. The method of claim 19, wherein the pairing process is a JUST WORKS BLUETOOTH LOW ENERGY pairing process.

21. The method of claim 18, wherein the key exchange protocol is a Diffie Hellman key exchange protocol.

22. The method of claim 17, wherein the first wireless connection type is a BLUETOOTH LOW ENERGY wireless connection type.

23. The method of claim 22, wherein the second wireless connection type is a Wireless Local Area Network (WLAN) according to an Institute for Electrical and Electronics Engineers (IEEE) 802.11 family of standards.

24. The method of claim 17, wherein reducing an output transmission power of the network connected computing device of a first wireless connection of a first wireless connection type comprises:
sending a power control command to a transmitter.

* * * * *

UNITED STATES PATENT AND TRADEMARK OFFICE
CERTIFICATE OF CORRECTION

PATENT NO. : 10,574,445 B2
APPLICATION NO. : 15/386485
DATED : February 25, 2020
INVENTOR(S) : Agerstam et al.

Page 1 of 1

It is certified that error appears in the above-identified patent and that said Letters Patent is hereby corrected as shown below:

In the Claims

In Column 15, Line 25, in Claim 17, before "configuration", insert --the--

Signed and Sealed this
Eighteenth Day of August, 2020

Andrei Iancu
*Director of the United States Patent and Trademark Office*